Jan. 25, 1966    R. E. STEWART    3,230,739
SLIP CLUTCH
Filed May 23, 1963
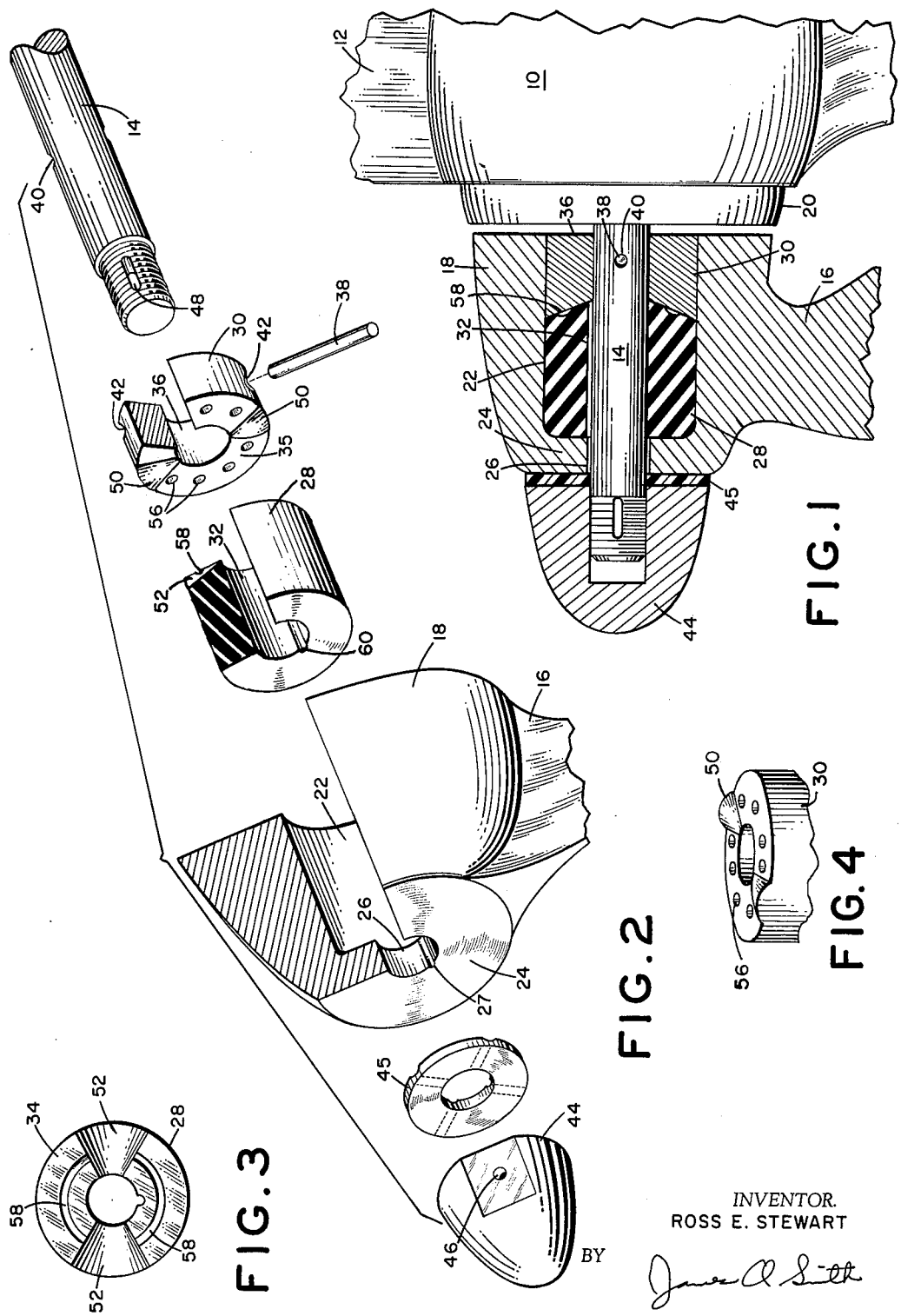
INVENTOR.
ROSS E. STEWART
BY
*James A. Smith*
ATTORNEY – # United States Patent Office 3,230,739
Patented Jan. 25, 1966

3,230,739
SLIP CLUTCH
Ross E. Stewart, Norwalk, Ohio, assignor to Clevite
Harris Products, Inc., a corporation of Ohio
Filed May 23, 1963, Ser. No. 282,795
14 Claims. (Cl. 64—28)

This invention relates to overload safety devices and, more particularly, to an improved slip clutch for a marine propeller drive unit.

Safety devices have been used extensively in outboard motors and other marine propulsion equipment to avoid damage to the drive shaft, gearing, etc., during excessive torque conditions. For example, if the propeller strikes a hidden obstruction or strikes bottom in shallow water, the safety device functions to disconnect the propeller from the drive shaft.

The shear pin is probably one of the most commonly used safety devices in the outboard motor field. In the usual arrangement a soft pin is mounted in a suitable transverse bore of the drive shaft whereby the ends of the pint transmit movement to the propeller hub or a part fixed thereto. When the propeller strikes an obstruction the ends of the pin are sheared to terminate the driving connection between the drive shaft and propeller. The disadvantage of the shear pin, however, is the necessity of disassembling a portion of the lower unit to replace the pin after striking an obstruction.

More proferred than the shear pin are slip clutch devices which permit relative movement of the propeller and driving shaft during excessive torque conditions and automatically restore a direct driving connection without servicing and disassembly of the lower unit. Generally, devices in this category comprise rubber to rubber contacting surfaces or metal to rubber contacting surfaces which undergo relative frictional slippage during excessive torque conditions.

While slip clutches of the above-described type are more desirable than shear pin protective devices they also possess limitations. Perhaps the most serious limitation is the relatively short life of such devices. During frictional slippage the rubber surfaces employed wear rapidly to eventually result in slippage during even normal operating conditions. When the motor is used extensively in shallow water or to "beach" a boat, the life of the slip clutch is extremely limited due to the continuous intermittent slippage encountered, and replacement at regular intervals is required. Thus, the slip clutch protective device has resulted in less than optimum performance.

The poor wearability characteristic of marine slip clutches is primarily the result of inadequate lubrication during frictional slippage. Even though the device is utilized in an underwater environment the contact pressure of the parts in frictional engagement inhibits the passage of lubricating water to the surfaces requiring lubrication. This problem is augmented by the fact that lubrication during normal load conditions must be prevented to avoid undesired slippage.

It is a principal object of this invention to provide an improved slip clutch possessing greater wearability than prior are devices.

Another object of the invention is to lubricate a slip clutch during overload operation thereof.

Still another object of the invention is to effect water lubrication of a marine slip clutch only during overload slippage thereof.

In a preferred embodiment of the invention a slip clutch is provided with a rotatable driven member and a rotatable driving member in driving engagement with the driven member. During excessive torque conditions surfaces of said members undergo relative frictional slippage to permit relative rotation of the driving and driven members. Lubrication of the surfaces subjected to frictional slippage is accomplished by the provision of lubrication ports extending through one of said members to the surface thereof subjected to frictional slippage. During frictional slippage the ports became uncovered to permit the passage of lubricant to the surfaces subjected to frictional slippage.

Other objects and advantages will become apparent from the following description taken in connection with the accompanying drawings wherein:

FIGURE 1 is a view in partial section of a portion of a marine drive unit illustrating a slip clutch embodying the invention;

FIGURE 2 is an exploded perspective view of parts shown in FIGURE 1;

FIGURE 3 is an end view of a part shown in FIGURES 1 and 2; and

FIGURE 4 is an isometric view showing the face of one of the parts.

Referring to FIGURE 1 of the drawing a lower gear housing of an outboard motor is indicated generally by the reference numeral 10. As is well known to those skilled in the art housing 10 is carried on the lower end of a vertical column 12 containing a drive shaft (not shown) and having at its upper end a suitable motor (not shown). Gearing (not shown) in housing 10 functions to convert the rotary motion of the vertical shaft within column 12 into rotary motion of a horizontal drive shaft 14 which extends from the housing 10 and is utilized to rotate a propeller 16 having a hub 18. The hub 18 as shown in FIGURE 1 is mounted in coaxial relationship with shaft 14 adjacent a housing cover and shaft seal 20 and is connected to the shaft 14 to be rotated thereby by the parts hereinafter described.

The hub 18 is provided with a central cylindrical cavity 22 which is substantially larger in diameter than shaft 14 and which extends longitudinally inward from the right end of the hub to define an end wall 24 at the left end of the hub. The end wall 24 is provided with a suitable central bore 26 which slidably receives shaft 14 as shown in FIGURE 1 to support the left end of hub 18 thereon. Bore 26 has a longitudinal groove 27 to allow passage of water along shaft 14 as will hereinafter be described in more detail.

A slip clutch embodying the invention is positioned within cavity 22 and comprises a driven member 28 fixedly mounted within cavity 22 of hub 18 and a driving member 30 fixedly mounted on shaft 14. Driven member 28 in this instance comprises a generally cylindrical-shaped flexible elastomeric rubber-like part force-fitted in cavity 22 against end wall 24 to be retained therein by elastic deformation and frictional or adhesive bonding of the rubber-like material to the cavity wall. The elastomeric part 28 is provided with a suitable coaxial bore 32 through which shaft 14 extends as shown in FIGURE 1 and is provided with a planar end surface 34 (FIGURE 3) at the right end thereof which is engaged by the left end face surface 35 (FIGURE 2) of driving member 30 as shown in FIGURE 1. A longitudinal groove 60 in the surface of the bore 32 aligned with groove 27 permits water circulation through hub 18 as will later be described and insures water lubrication of the surface of bore 32.

Driving member 30 in the disclosed embodiment comprises a rigid disk formed from metal or other suitable material and is provided with a central bore 36 for slidably receiving shaft 14. The disk 30 is provided with an outer diameter corresponding to the diameter of cavity 22 to be slidably received therein and provide support for the right end of hub 18 as shown in FIGURE 1. Retaining means such as a pin 38 is positioned in a transverse bore 40 of shaft 14 to determine the axial position of disk 30 on shaft 14. The pin 38 is received by a complemental transverse slot 42 (FIGURE 2) in the right end face of disk 30 to thereby key the disk to shaft 14. Optionally pin 38 may comprise a shear pin of the type hereinbefore described to provide additional overload protection.

In assembly of the parts thus far described pin 38 is first inserted in bore 40 and disk 30 is inserted on shaft 14 and positioned whereby pin 38 is received in slot 42. Elastomeric part 28 is mounted in hub 18 and the resulting sub-assembly is inserted on shaft 14 until disk 30 is engaged by part 28. A suitable bearing washer 45 having radial water flow grooves in the face surface thereof as shown in FIGURE 2 is then inserted on shaft 14 and a retaining nut 44 is threaded on the end of shaft 14 to clamp the part 28 into engagement with driving disk 30 and establish a driving connection therebetween, as will presently be described. The nut 44 is provided with suitable transverse bores 46 and shaft 14 is provided with a suitable elongated slot 48 for insertion of a nut retaining cotter pin (not shown).

Referring now more specifically to the construction and function of driven member 28 and driving member 30, a plurality (in this case two) of driving lugs 50 are formed on the end face surface of disk 30 as shown more clearly in FIGURE 2. The lugs 50 are adapted to be received in and to engage the walls of complemental spaced recesses 52 in the end face surface 34 of rubberlike part 28 when face surfaces 34 and 35 are clamped together as shown in FIGURE 1. Thus, the lugs 50 and recesses 52 normally establish a driving connection between part 28 and disk 30 to normally transmit movement from shaft 14 to propeller hub 18.

The driving connection established by recesses 52 and lugs 50 is terminated during excessive torque conditions to establish relative frictional slippage of the part 28 and disk 30 in the following manner. Assume, for example, propeller 16 strikes an underwater obstruction. The excessive torque load will result in compression of the elastomeric material surrounding the recesses 52 under the influence of the driving force of lugs 50 to the extent that lugs 50 will move out of engagement with recesses 52 and undergo frictional slippage on face surface 34 to permit movement of shaft 14 relative to propeller hub 18. Disk 30 will rotate relative to part 28 for one-half a revolution until lugs 50 are again aligned with recesses 52 whereupon re-engagement will occur if the excessive torque condition has terminated. Otherwise relative rotation will occur for another half revolution or more depending on the duration of the excessive torque condition.

Referring now to the lubrication feature of the invention, the driving disk 30 is provided with a plurality of radially spaced holes or ports 56 extending between opposite face surfaces thereof and positioned on a circle aligned with an annular groove 58 on the end surface 34 of elastomeric part 28. Accordingly, water can pass through the clearance between hub 18 and seal 29, through holes 56 to annular groove 58. During normal load conditions the end face surfaces of disk 30 and part 28 will be in tight sealing engagement and groove 58 will be closed. However, when the lugs 50 move out of engagement with recesses 52 during an excessive torque condition, the two adjacent end faces will be separated as a result of rubber deformation caused by the interposed thickness of lugs 50 and a flow passage for lubricating water will be established. Accordingly, as relative frictional slippage occurs water will flow from annular groove 58 to provide water lubrication of the surfaces subjected to frictional slippage. Upon re-engagement of lugs 50 with recesses 52 the groove 58 will again be sealed to terminate the lubrication.

During the described slippage condition a flow passage for lubricating water is established through ports 56, the space between disk 30 and part 28 produced by separation thereof, through longitudinal grooves 60 and 27, and through radial grooves in washer 45. Thus during the slippage condition a running water flow will occur through hub 18 and the space between disk 30 and part 28. This water circulation is augmented by varying pressure differentials between opposite ends of hub 18 created by movement of lower unit 10 and operation of propeller 16. In effect the pressure differentials encountered establish a pumping action to advantageously result in maximum water flow over the slippage surfaces.

The lubricant feature thus provides adequate lubrication during slippage of the clutch to reduce frictional wear to a minimum. Advantageously, however, the lubrication does not occur during normal operation, and there is no tendency for slippage under normal operating conditions.

To further minimize frictional wear of the end surface 34 of rubber part 28 a coating of nylon, Teflon or similar low friction surfacing material is applied to surface 34 and/or surface 35.

The longitudinal groove 60 in the wall surface of bore 32 through which water is circulated as mentioned above in response to differential pressure conditions insures adequate lubrication of the wall surface of bore 32 during relative slippage when shaft 14 is turning in bore 32. Thus, water circulated through groove 60 reduces wear of the elastomeric material at this point to a minimum. Optionally a shaft bearing sleeve formed from nylon or Teflon may be positioned within bore 32 of part 28 to impart additional rigidity to elastomeric part 28, sufficient shaft clearance in this case being provided to insure water circulation during the slippage condition.

It will be apparent that I have disclosed an improved lubricated slip clutch assembly having particular utility in the marine field as an underwater safety device. It will also be apparent that many changes may be made in the construction and arrangement of parts disclosed and in the application thereof without departing from the scope of the invention as defined in the appended claims.

It is claimed and desired to secure by Letters Patent of the United States:

1. A torque transmission device comprising: a driven member of resilient material rotatable about an axis; a driving member engaging said driven member and rotatable about said axis; one of said members having a recess in its engaging face and the other of said members having a projecting lug projecting into said recess forming a yieldable driving connection between said members releasable axially during excessive torque conditions to permit relative frictional slippage of adjacent engaging surfaces of said members and to cause said engaging surfaces to move apart axially; and at least one lubrication port in one of said members for supplying lubricant to the engaging surfaces of said recess and lug only during said frictional slippage thereof.

2. A torque transmission device comprising: a driven member rotatable about an axis; a driving member rotatable about said axis and having a surface in engagement with a surface of said driven member; means axially biasing said members together, a driving lug on one of said surfaces; a recess on the other of said surfaces receiving said lug to normally establish a driving connection between said members; said lug being axially disengageable with said recess during excessive torque conditions for frictional slippage on said other surface; and ports extending through one of said members to effect lubrication of said lug and recess surfaces only during said frictional slippage.

3. A torque transmission device comprising: a rotatable driven member of resilient material having a planar surface defining at least one recess therein; a rotatable driving member having a planar surface complemental to said surface of said driven member for frictional engagement therewith and having a driving lug formed thereon to be received by said recess when said surfaces are in engagement; said lug being disengageable from said recess during excessive torque conditions by elastic deformation of said driven member for frictional slippage on said surface of said driven member and to establish clearance between said surfaces during said relative slippage; and at least one lubricant port extending through said driving member to said surface thereof; said ports being closed by engagement of said surfaces and opened by establishment of said clearance to establish lubrication of said surfaces and lug during said relative slippage.

4. A torque transmission device as claimed in claim 3 wherein said driven member is formed from rubber material and said driving member is formed from metal or other suitable rigid material.

5. A propeller clutch for transmitting power from a drive shaft to a propeller in an underwater environment; a resilient member mounted on the propeller for rotation therewith; a rigid driving member mounted on the drive shaft coaxial with said resilient member and yieldably engaging said resilient member to establish face-to-face substantially non-lubricated engagement; one of said members having a recess in its engaging face and the other of said members having a projecting lug projecting into said recess, said members having surfaces adapted to move axially away from each other and to undergo relative frictional slippage during excessive torque conditions; and at least one lubrication port extending through one of said members for supplying lubricating water to said recess and lug surfaces from the underwater environment only during said frictional slippage to effect lubrication thereof.

6. A propeller clutch for transmitting power from a drive shaft to a propeller hub in an underwater marine drive unit comprising: a resilient member formed from elastomeric rubber-like material mounted within the hub for rotation therewith and defining a planar surface; a rigid driving member mounted on the drive shaft coaxial with said resilient member and having a planar surface normally engaging said surface of said resilient member; a drive lug formed on said surface of said driving member; a recess formed on said surface of said resilient member and receiving said lug during substantially non-lubricated driving engagement of said surfaces; said lug being axially disengageable with said recess during excessive torque conditions for frictional slippage on said surface of said resilient member; and a plurality of ports extending through said driving member to said surface thereof for supplying lubricating water to said surfaces substantially only during said frictional slippage.

7. A propeller clutch as claimed in claim 6 wherein said driving member comprises a metal disk and said planar surface thereof is provided with an annular groove connecting the ends of said ports.

8. An underwater drive unit for an outboard motor comprising: a housing; a propeller comprising a hub having one end positioned adjacent said housing; said hub having a longitudinal cylindrical cavity extending from said one end thereof; a drive shaft extending from said housing through said cavity and the other end of said hub in coaxial relationship therewith; a cylindrical member having a central bore slidably receiving said shaft fixedly mounted within said cavity for rotation with said hub; a driving disk member attached to said shaft for rotation therewith and positioned in face-to-face substantially non-lubricated engagement with said cylindrical member to transmit rotational movement of said shaft to said hub; one of said members having a recess in its engaging face and the other of said members having a projecting lug projecting into said recess, said cylindrical member and disk member being operative to their mutually engaging faces to move axially away from each other and to undergo relative frictional slippage during excessive torque conditions; and a plurality of lubrication ports extending through said disk for supplying water to the said recess and lug surfaces subject to frictional slippage substantially only during said slippage.

9. An underwater drive unit for an outboard motor as claimed in claim 8 wherein said member is provided with a pair of recesses in the end surface thereof and said disk is provided with a pair of driving lugs for driving engagement with said recesses respectively.

10. An underwater drive unit for an outboard motor as claimed in claim 9 wherein said member is formed from elastomeric rubber-like material and said driving lugs disengage from said recesses by elastic deformation of the rubber-like material during excessive torque conditions permitting frictional slippage of said lugs on said end surface of said member.

11. An underwater drive unit for an outboard motor as claimed in claim 10 wherein the ends of said ports are closed by engagement of said disk with said member and opened by clearance established during frictional slippage of said lugs on said end surface.

12. An underwater drive unit for an outboard motor as claimed in claim 11 wherein the surface of said disk is provided with an annular groove connecting the ends of said ports.

13. An underwater drive unit for an outboard motor comprising: a housing; a propeller including a hub having one end positioned adjacent said housing; a drive shaft extending from said housing and through said hub in coaxial relationship therewith; a resilient member mounted within said hub for rotation therewith; a rigid driving member mounted on said shaft to engage said resilient member and establish a driving connection between said shaft and said propeller; said members having surfaces adapted to undergo relative frictional slippage during excessive torque conditions; means defining an axial flow passage through said hub including at least one port extending through one of said members; said port being closed during driving engagement of said members and open during frictional slippage thereof to establish a running water flow through said hub in response to pressure differentials across said hub to thereby effect lubrication of said surfaces during said frictional slippage thereof.

14. An underwater drive unit as claimed in claim 13 wherein said driving member comprises a disk attached to said shaft for rotation therewith and said resilient member comprises a cylindrical shaped part of elastomeric rubber-like material having an axial bore for receiving said shaft and fixed within said hub in axial alignment therewith; said disk having a pair of driving lugs for driving engagement with complemental recesses in said cylindrical part during normal torque conditions; said lugs being adapted to become disengaged from said recesses during excessive torque conditions to effect separation of said surfaces and opening of said port.

References Cited by the Examiner
UNITED STATES PATENTS

| | | | |
|---|---|---|---|
| 2,164,485 | 7/1939 | Yantis. | |
| 2,477,521 | 7/1949 | Martin | 64—29 |
| 2,501,648 | 3/1950 | Ogden | 64—29 |
| 2,560,427 | 7/1951 | Foss | 64—29 |
| 2,564,605 | 8/1951 | Martin. | |
| 2,729,076 | 1/1956 | Thompson | 46—29 |

BROUGHTON G. DURHAM, *Primary Examiner.*

ROBERT C. RIORDON, *Examiner.*